(12) United States Patent
Lacher et al.

(10) Patent No.: US 12,447,571 B2
(45) Date of Patent: Oct. 21, 2025

(54) METHOD FOR ACTIVATING AND DEACTIVATING A SPINDLE LOCK IN A POWER TOOL, AND POWER TOOL

(71) Applicant: Hilti Aktiengesellschaft, Schaan (LI)

(72) Inventors: Michael Lacher, Schwabmuenchen (DE); Stefan Ringler, Schwabmuehlhausen (DE); Roland Schwab, Geltendorf (DE); Manel Ouni, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/286,430

(22) PCT Filed: Apr. 12, 2022

(86) PCT No.: PCT/EP2022/059675
§ 371 (c)(1),
(2) Date: Oct. 11, 2023

(87) PCT Pub. No.: WO2022/228880
PCT Pub. Date: Nov. 3, 2022

(65) Prior Publication Data
US 2024/0181584 A1    Jun. 6, 2024

(30) Foreign Application Priority Data

Apr. 26, 2021 (EP) ..................... 21170463

(51) Int. Cl.
*B25F 5/00* (2006.01)
*B23Q 5/04* (2006.01)

(52) U.S. Cl.
CPC .................. *B23Q 5/043* (2013.01)

(58) Field of Classification Search
USPC ........................................... 173/20
See application file for complete search history.

(56) References Cited

U.S. PATENT DOCUMENTS

| 5,733,074 A | 3/1998 | Stoeck et al. |
| 2013/0068529 A1 | 3/2013 | Hofbrucker et al. |

(Continued)

FOREIGN PATENT DOCUMENTS

| DE | 102010002677 A1 | 9/2011 |
| DE | 102015222152 A1 | 5/2017 |

(Continued)

OTHER PUBLICATIONS

International Search Report of PCT/EP2022/059675 dated Jul. 29, 2022.

(Continued)

*Primary Examiner* — Chinyere J Rushing-Tucker
(74) *Attorney, Agent, or Firm* — Davidson Kappel LLC

(57) ABSTRACT

Methods for activating and deactivating a spindle lock in a power tool, wherein the spindle lock can be activated, for example, by an intuitive movement by the user. In particular, the spindle lock can be activated by a rotary movement of the user on the tool fitting, which is recognized by the device electronics of the power tool. Exceeding a limit value for an angle of rotation or a rotational speed can be used by the device electronics as an activation signal for the spindle lock. The spindle lock can be deactivated if the device electronics detect a rotary movement of the tool fitting in the opposite direction. In further aspects, the invention relates to a power tool with which the methods for activating and deactivating a spindle lock can be carried out.

19 Claims, 1 Drawing Sheet

(56) References Cited

U.S. PATENT DOCUMENTS

| | | | |
|---|---|---|---|
| 2017/0129091 A1* | 5/2017 | Schiegel | ................ B25D 16/00 |
| 2019/0061081 A1 | 2/2019 | Schaer | |
| 2020/0326778 A1 | 10/2020 | Asada et al. | |
| 2022/0001462 A1 | 1/2022 | Sunabe et al. | |

FOREIGN PATENT DOCUMENTS

| | | | |
|---|---|---|---|
| EP | 2502694 A1 | 9/2012 |
| JP | H08243952 A | 9/1996 |
| JP | 2019507024 A | 3/2019 |
| JP | 2020099958 A | 7/2020 |
| WO | WO 2017129538 A1 | 8/2017 |
| WO | WO2021058519 A1 | 4/2021 |
| WO | WO 2022/228879 A1 | 11/2022 |
| WO | WO2022/228880 A1 | 11/2022 |

OTHER PUBLICATIONS

International Search Report of PCT/EP2022/059673 dated Jul. 29, 2022.

* cited by examiner

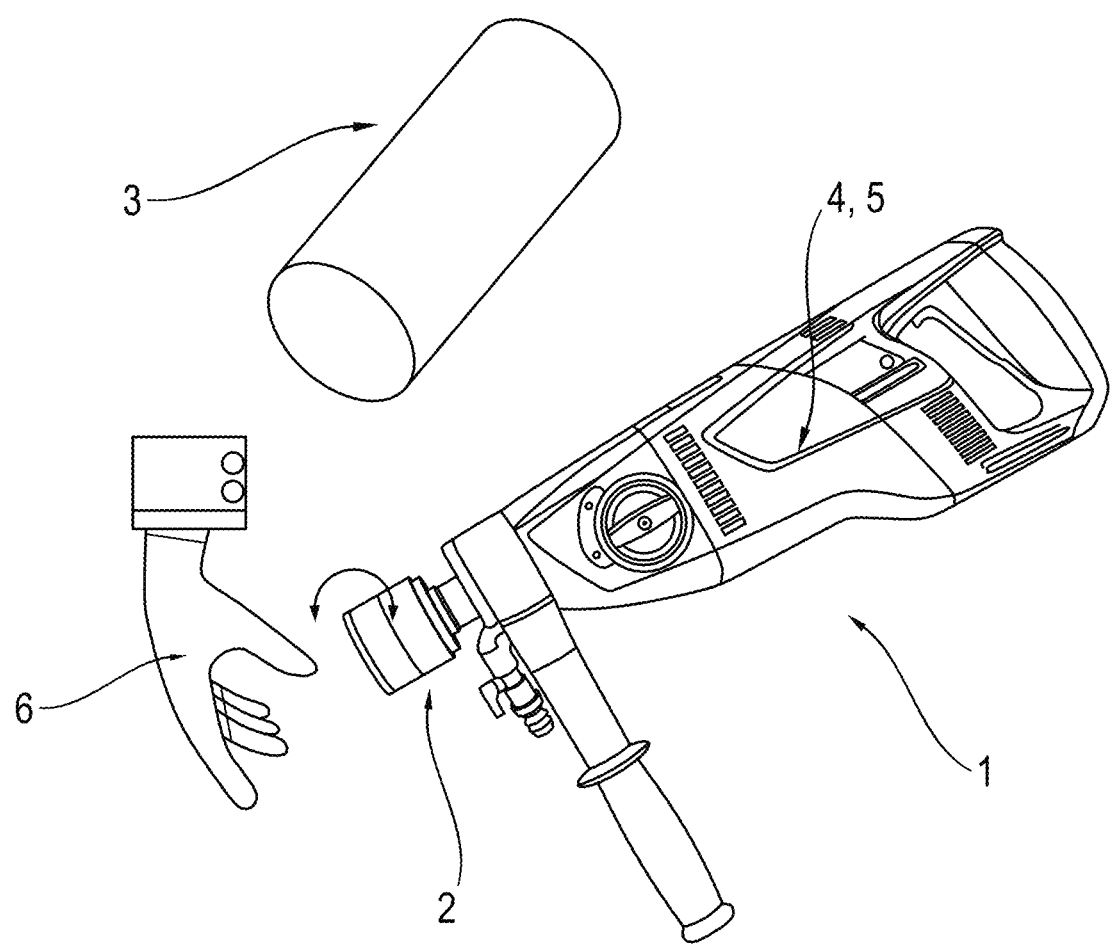

METHOD FOR ACTIVATING AND DEACTIVATING A SPINDLE LOCK IN A POWER TOOL, AND POWER TOOL

The present invention relates to a method for activating and deactivating a spindle lock in a power tool. In further aspects, the invention relates to a power tool with which the methods for activating and deactivating a spindle lock can be carried out.

BACKGROUND OF THE INVENTION

The prior art discloses power tools by means of which work—for example on a building site or in the DIY sector—can be carried out. Power tools may be cutting devices or cut-off devices, angle grinders or cut-off grinders, core drilling devices, hammer drills or chisel drills, without being restricted thereto. The power tools usually comprise tools, which may be disk-shaped, rotating tools, such as cut-off disks or grinding disks, or hammering or chiselling tools.

The tools of the power tools that are known from the prior art are usually driven via an electric motor within the power tool. The motor rotates, with the rotation of the motor being converted into a rotation of the tool or into a hammering or chiselling movement of the tool. In the case of a core drilling device, drill bits are used as a tool to cut out cylindrical drill cores from solid substrates, such as concrete, masonry or stone. Drill bits are substantially hollow on the inside in order to receive the drill core. The user of a core drilling device knows from experience that it can be a challenge to get a drill bit that is blocked or jammed in the substrate out of the borehole.

Power tools, such as, for example, a core drilling device, usually have a spindle lock, which preferably allows the tool of the power tool to be changed quickly. The spindle can be blocked in such a way that the tool of the power tool can be released particularly easily. Mechanical and electronic methods for locking the spindle are known in the prior art. In the case of mechanical methods, mechanical switches or slide switches are usually provided on the power tool, with which the spindle can be locked to open the tool lock. In the case of an electronic spindle lock, the spindle is often locked by actuating a preferably electronic switching contact. In this case, the actuation of the switch in the device electronics can be converted by a microswitch and/or a microcontroller into a corresponding energization of the motor of the power tool.

SUMMARY OF THE INVENTION

However, it has been shown that the provision of a dedicated switch for activating and deactivating the spindle lock in a power tool is complicated to implement. In addition, the provision of such a switch is not desirable for reasons of space and it cannot be ensured that such a switch would be ergonomically sensible to be actuated by a user of the power tool. Furthermore, additional switches and operating elements require additional space, which is contrary to the need for compact, handy power tools.

An object on which the present invention is based is to overcome the disadvantages of the prior art described above and to specify methods for activating and deactivating a spindle lock in a power tool. It would be desirable if the corresponding power tool could manage without an additional switch for activating or deactivating the spindle lock. In addition, those skilled in the art would appreciate it if the activation of the spindle lock could be started as intuitively as possible without the user having to actuate complicated button combinations or carry out manual actions. In addition, the power tool to be provided should be as compact and handy as possible. Another aim of the invention is to show how a drill bit that is blocked or jammed in the substrate can be freed from a borehole more easily than before.

In a first aspect, a method for activating a spindle lock in a power tool is provided according to the invention. The power tool comprises a tool fitting for receiving a tool, as well as a motor and device electronics. The method for activating the spindle lock comprises the following steps:
  a) carrying out a first rotary movement with the tool fitting of the power tool in a first direction of rotation, wherein the first rotary movement can be defined by an angle of rotation and/or a rotational speed and wherein limit values for the angle of rotation and/or the rotational speed are stored in the power tool,
  b) activation of the spindle lock by the device electronics of the power tool if at least one of the limit values for the angle of rotation and/or the rotational speed is exceeded.

In the proposed method, it is preferred that a user of the power tool touches and rotates the tool fitting thereof. In other words, the user can perform a rotary movement with the tool fitting, and this rotary movement can be detected by the device electronics. The tool fitting is preferably rotated in a first direction of rotation, wherein this first direction of rotation can be, for example, the spatial direction "to the right" or "to the left". The corresponding spatial direction and direction of rotation are indicated in the FIGURE by the round arrow.

With the proposed method for activating the spindle lock, it is possible to provide a method in which the corresponding power tool does not require an additional switch for activating the spindle lock. In addition, the method is particularly intuitive to carry out, since the user performs an intuitive movement on the power tool by rotating the tool fitting. It is preferred within the meaning of the invention that this intuitive rotary movement by the user on the tool fitting of the power tool can be recognized by the power tool or its device electronics.

It is preferred within the meaning of the invention that the power tool or its device electronics comprises at least one rotation sensor, which can be arranged, for example, in close proximity to the motor of the power tool. The rotation sensor is preferably set up to detect a rotary movement. Within the meaning of the invention, it is very particularly preferred that the rotation sensor is able to detect a rotary movement of the rotor of the motor of the power tool. The rotation sensor can comprise, for example, Hall sensors or AMR sensors (sensor whose measuring principle is based on the anisotropic magnetoresistive effect), without being limited thereto. It is preferred within the meaning of the invention that the sensor systems used to detect the rotary movement are set up to generate digital and/or analog signals that describe an angle of rotation of the rotor of the motor of the power tool.

The rotary movement of the user on the tool fitting of the power tool can be defined in particular by an angle of rotation and/or a rotational speed. The angle of rotation preferably describes the angular range by which the tool fitting is deflected from an original position or rest position. The angle of rotation can preferably assume positive or negative values, with positive angles of rotation standing, for example, for a rotary movement of the tool fitting in a first spatial direction, while negative angles of rotation stand, for example, for a rotary movement of the tool fitting in a second spatial direction. In the context of the present invention, for example, angles of rotation are preferred whose magnitude is in a range from 1 to 60 degrees, with all intermediate values, such as 3.5 degrees, 10 degrees, 17 degrees, 28.3 degrees, etc., preferably also being able to be assumed. It is preferred within the meaning of the invention that the angles of rotation specify a positive or negative deflection of the rotor of the motor of the power tool around a rest position.

The rotational speed preferably indicates how quickly the angle of rotation changes over time. It is preferred within the meaning of the invention that the rotary movement of the tool fitting, which is brought about or caused by the user of the power tool, is referred to as a user-initiated or first rotary movement of the tool fitting of the power tool.

It is preferred within the meaning of the invention that limit values are defined for the angle of rotation and/or for the rotational speed, with the spindle lock preferably being activated automatically when these values are exceeded. A spindle locking function, which is preferably designed electronically, is preferably implemented in the proposed power tool, which function can be activated when the limit values for the angle of rotation and/or the rotational speed are exceeded. This activation preferably takes place automatically as soon as the device electronics of the power tool detect that at least one of the limit values for the angle of rotation and/or rotational speed has been exceeded.

It is preferred within the meaning of the invention that the magnitude of the limit value for the angle of rotation is in a range from 1 to 120 degrees, preferably in a range from 1 to 90 degrees and most preferably in a range from 1 to 60 degrees. In other words, this means that the limit values can be in a range from −120 degrees to +120 degrees, preferably in a range between −90 degrees and +90 degrees and most preferably in a range between −60 degrees and +60 degrees, with the deflections preferably being specified in each case around a rest position of the rotor of the motor of the power tool.

The limit value for the rotational speed may be, for example, in a range from 0.05 degree/second to 60 degrees/second, preferably in a range from 0.2 degree/second to 45 degrees/second and most preferably in a range from 0.5 degree/second to 30 degrees/second.

It is preferred within the meaning of the invention that the spindle lock represents an electronic function that can already be implemented in the power tool, for example. Unlike conventional power tools as known from the prior art, it is not necessary in the context of the present invention to start the spindle lock with a button provided separately for this purpose or with such a switch. Rather, in the context of the present invention, the ability of the power tool or its device electronics is used to detect a rotary movement of the tool fitting in relation to the angle of rotation and/or rotational speed and evaluate it in such a way that exceeding of corresponding limit values is recognized and used as a trigger or start signal for the spindle lock.

It is preferred within the meaning of the invention that only one action by the user of the power tool is required to activate the spindle lock in the context of the present invention, namely the execution of the rotary movement on the tool fitting of the power tool. With the present invention, the activation of the spindle lock can thus be made much simpler and more intuitive than with conventional power tools as are known from the prior art. Advantageously, the handling of the proposed power tool can be significantly simplified in this way compared with conventional power tools. In addition, an additional switch for activating the preferably electronic spindle locking function can be dispensed with in the design of the power tool, since such a switch is no longer required due to the advantageous interaction of the device electronics and the power tool, as is the subject of the present invention. By saving on an additional switch, the invention makes it possible to provide a particularly compact, handy power tool that is easier to handle intuitively.

It is preferred within the meaning of the invention that the rotary movement is detected by the device electronics as a rotation of the motor without active current supply. The device electronics of the power tool are preferably set up to recognize a rotary movement of the tool fitting as a rotation of the motor without active current supply and to perceive the exceeding of limit values with respect to an angle of rotation and/or a rotational speed of the rotary movement as a start signal for activating the spindle lock.

In a second aspect, the invention relates to a method for deactivating a spindle lock in a power tool, wherein the power tool comprises a tool fitting for receiving a tool, as well as a motor and device electronics. The method for deactivating the spindle lock comprises the following steps:

a) applying a torque to the motor of the power tool in a second direction of rotation while the spindle lock is active, b) rotary movement of the tool fitting in the second spatial direction due to the torque being applied to the motor in the second spatial direction, c) detection of the rotary movement in the second spatial direction by the device electronics, d) deactivation of the spindle lock by the device electronics of the power tool when a rotary movement of the tool fitting in the second spatial direction is detected.

The terms, definitions and technical advantages introduced for the method for activating the spindle lock preferably apply analogously to the method for deactivating the spindle lock.

It is preferred within the meaning of the invention that a torque is applied to the motor of the power tool for the purpose of locking the spindle, with a direction of rotation or action of this torque preferably being directed in the opposite direction to the first direction of rotation of the rotary movement of the tool fitting, which is carried out by the user of the power tool. It is preferred within the meaning of the invention that the spindle lock is an electronic function of the power tool, in which the motor of the power tool is powered by the power or device electronics. One advantage of the invention is that no additional device is required on the power tool in order to carry out the proposed method. It is preferred within the meaning of the invention that a speed of the motor of the power tool is regulated to a value in the range of 0 revolutions per unit time (for example rounds per minute, RPM), so that in this way the motor of the power tool is prevented from rotating.

The direction of rotation or action of the torque is referred to as the second direction of rotation within the meaning of the invention. It is preferably directed in the opposite direction to the direction of rotation of the first rotary movement of the tool fitting. If the tool fitting is rotated by the user of the power tool, for example in a spatial direction "to the right" in order to activate the spindle lock, the torque applied to the motor of the power tool preferably acts in a spatial direction "to the left".

A rotary movement of the tool fitting is preferably caused by the application of the torque to the motor. This rotary movement of the tool fitting caused by the motor is preferably referred to as the second rotary movement of the tool fitting within the meaning of the invention. It is preferred within the meaning of the invention that releasing of the tool fitting by the user leads to the application of torque leading to a rotary movement of the tool fitting in the second spatial direction. In other words, the tool fitting can perform a rotary movement counter to a direction of rotation of the original rotary movement in particular when the user of the power tool releases the tool fitting, i.e. no longer firmly holds the tool fitting. It is very particularly preferred within the meaning of the invention that the application of the torque to the motor leads to a rotary movement of the tool fitting, with this preferably motor-initiated rotary movement being directed in the opposite direction to the original rotary movement initiated by the user. In other words, the application of the torque to the motor leads to a rotary movement of the tool fitting, with this second rotary movement of the tool fitting being directed in the opposite direction to the first rotary movement of the tool fitting. Within the meaning of the invention, the second rotary movement of the tool fitting can preferably also be referred to as a counter-rotary movement to the original first rotary movement of the tool fitting. Preferably, the torque is applied to the motor in the second direction of rotation, in particular when the spindle lock is active.

The rotary movement of the tool fitting in the second spatial direction can be detected by the device electronics of the power tool. This second rotary movement of the tool fitting is preferably detected using the same sensor that is also used to detect the first rotary movement. Alternatively, it can also be preferred that two different sensors or sensor systems are used. The first rotary movement and the second rotary movement preferably differ in their direction of rotation and in the direction of the electric current with which the motor of the power tool is energized.

The spindle lock of the power tool is preferably deactivated as soon as the device electronics detect the rotary movement of the tool fitting in the second spatial direction or when the tool fitting is again in the region of the rest position. The power tool can comprise a control device for detecting the rotary movements or for evaluating them and converting them into a (de)activation signal for the spindle lock, which control device can in turn preferably comprise a processor and/or a memory. It is preferred within the meaning of the invention that the power tool comprises a control device that is set up to detect rotary movements of the tool fitting in the different spatial directions and to activate or deactivate the spindle lock depending on the spatial direction.

Within the meaning of the invention, it is very particularly preferred that the power tool does not require an additional switch for (de)activating the spindle lock. As described, there is no need for a switch on the power tool intended specifically for (de)activating the spindle lock, since the (de)activation of the spindle lock is effected according to the invention by detecting a rotary movement of the tool fitting.

Advantages of the invention are, in particular, that a particularly intuitive activation or deactivation of the spindle lock can be provided. In addition, a simple, intuitive and clear operation of the power tool is made possible, which in particular manages with a comparatively small number of switches. In this way, in particular, the production costs for the power tool can also be kept low and a space-saving, compact power tool can be provided. This can be of particular advantage in particular when a hand-held power tool is to be provided rather than a column-mounted one. Within the meaning of the invention, it is very particularly preferred that the power tool is a core drilling device. It is of course also possible to use the proposed methods for other types of power tools, such as cut-off or angle grinders, drilling machines or hammer drills, chisels or other devices.

In a further aspect, the invention relates to a power tool for carrying out the method for activating a spindle lock, wherein the power tool has a tool fitting for receiving a tool, as well as a motor and device electronics. The power tool according to this aspect of the invention is characterized in that the tool fitting is designed to be rotatable and the device electronics are set up to detect an angle of rotation and/or a rotational speed of a rotary movement of the tool fitting. A spindle lock can be activated with the device electronics if at least one limit value for the angle of rotation and/or the rotational speed is exceeded. The device electronics can activate the preferably electronic spindle locking function of the power tool when it detects a rotary movement of the tool fitting that exceeds a limit angle of rotation. Alternatively or additionally, the device electronics can activate the spindle lock if a particularly rapid rotary movement is detected. A particularly rapid rotary movement can be recognized in particular by the fact that the rotational speed of the rotary movement exceeds a limit rotational speed. The limit values for the angle of rotation and/or rotational speed can be stored in the power tool. For this purpose, the power tool can preferably comprise a control device which comprises, for example, a processor and/or a memory. The control device of the power tool can be set up in particular to make a comparison between the current angle of rotation and the limit angle of rotation. In particular, the control device can be set up to carry out a comparison between a current rotational speed and a limit rotational speed. If this comparison shows that the current values for the angle of rotation and/or rotational speed exceed the corresponding limit values, the spindle lock is activated. This activation is preferably carried out by the device electronics or the control device. The control device can in particular represent a component of the device electronics.

In yet another aspect, the invention relates to a power tool for carrying out the method for deactivating a spindle lock, wherein the power tool has a tool fitting for receiving a tool, as well as a motor and device electronics. The power tool according to this aspect of the invention is characterized in that a torque can be applied to the motor of the power tool, wherein the device electronics are set up to detect a rotary movement of the tool fitting and to deactivate the spindle lock when a rotary movement in a second spatial direction is detected. The tool fitting is preferably also designed to be rotatable in this preferred embodiment of the invention. It is preferred within the meaning of the invention that the torque is applied to the motor by the power tool or its spindle locking function. The direction of rotation or action is preferably directed in the opposite direction to the direction of the original rotary movement of the tool fitting, which is caused by the user of the power tool. The application of torque to the motor leads in particular to a rotary movement of the tool fitting in the direction of rotation or action of the torque. Within the meaning of the invention, this preferably means that the tool fitting is caused by the motor of the power tool to make a rotary movement which is in the opposite direction to the initial or first rotary movement of the tool fitting caused by the user. This rotary movement can also be detected by the device electronics of the power tool and used as a deactivation signal for the spindle lock. In other words, the spindle lock is deactivated when the power tool detects a second rotary movement of the tool fitting, which is in the opposite direction to a first rotary movement of the tool fitting.

It is preferred within the meaning of the invention that the torque is applied to the motor while the spindle lock is active. It is preferably the application of the torque to the motor that leads to the second rotary movement of the tool fitting. In other words, the application of the torque to the motor causes a rotary movement of the tool fitting, with the torque being directed in the opposite direction to the first rotary movement of the tool fitting.

Within the meaning of the invention, it is very particularly preferred that the power tool does not require an additional switch for activating and/or deactivating the spindle lock.

Preferably, the invention can also facilitate the loosening of a drill bit jammed in a borehole when the power tool is a core drilling device. In order to remove a jammed drill bit from the bottom of the borehole, rotary movements are usually required on the power tool. With a non-locked device, however, there is no rigid connection between the tool and the handles of the power tool. Therefore, the device handles cannot be used to loosen the drill bit. With the proposed intuitive activation of the spindle lock, rotation by the user on the power tool is recognized by the power tool and a torque can be transmitted to the drill bit by the counter-torque of the spindle locking function.

It has been shown that the use of the device can be significantly expanded or improved with the invention. If the invention is used, for example, in an angle grinder, in some machines it may be necessary to actuate, that is to say as a rule press, a second tool or mechanical lock to open and/or close the grinding disk mount. This actuation of additional components of the power tool can advantageously be dispensed with in the case of the power tool proposed according to the invention. A similar advantage can be achieved, for example, if the invention is used on a hand-held circular saw.

Further advantages will become apparent from the following description of the FIGURE. The FIGURE, the description and the claims contain numerous features in combination. A person skilled in the art will expediently also consider the features individually and combine them to form useful further combinations.

BRIEF DESCRIPTION OF THE DRAWING

Identical and similar components are denoted by the same reference signs in the FIGURE,
in which:
FIG. 1 shows a view of an exemplary preferred embodiment of the invention.

DETAILED DESCRIPTION

FIG. 1 shows a preferred embodiment of a proposed power tool 1. The power tool 1 comprises a motor 4 and device electronics 5, which can be accommodated in a housing of the power tool 1. The locations indicated in FIG. 1 for the motor 4 and the device electronics 5 of the power tool 1 are to be understood as examples; of course, other positions within the proposed power tool 1 are also conceivable. The power tool 1 also has a tool fitting 2 for fastening a tool 3. The power tool 1 shown in FIG. 1 is a core drilling device whose tool is formed by a drill bit 3. A drill bit 3 is indicated schematically at the top left in the upper region of FIG. 1.

In addition, a hand of a user 6 of the power tool 1 is indicated in FIG. 1. The user 6 can grip the tool fitting 2 of the power tool 1 and rotate it. Within the meaning of the invention, said user thus preferably causes the first rotary movement of the tool fitting 2 of the power tool 1. This first rotary movement of the tool fitting 2 can take place in a spatial direction "to the right" or "to the left", which is indicated in FIG. 1 by the curved double arrow. The direction of rotation of the first rotary movement of the tool fitting 2 is preferably also referred to as the first direction of rotation within the meaning of the invention. The power tool 1 is preferably set up to detect the first rotary movement of the tool fitting 2. The rotary movement of the tool fitting 2 can preferably be described by an angle of rotation and/or a rotational speed. Limit values for the angle of rotation and/or the rotational speed are stored in the power tool 1, with the power tool 1 preferably being set up to detect current angles of rotation and rotational speeds and to compare them with the stored limit values. If the result of such a comparison is that one of the stored limit values is exceeded, the spindle lock is preferably activated automatically.

When the spindle lock is active, a torque can be applied to the motor 4 of the power tool 1. This application of torque can be initiated by the device electronics 5 of the power tool 1. The torque is preferably directed in the opposite direction to the direction of rotation of the first rotary movement of the tool fitting 2. The torque causes a second rotary movement of the tool fitting 2, the second rotary movement of the tool fitting 2 being directed in the opposite direction to the first rotary movement of the tool fitting 2. This second rotary movement of the tool fitting 2 can be recognized by the power tool 1 and converted into a deactivation of the spindle lock. In other words, the detection of the second rotary movement of the tool fitting 2 can be used as a signal for deactivating the spindle lock of the power tool 1. The corresponding detection and control processes preferably take place in the device electronics 5 of the power tool 1. However, the power tool 1 can also comprise a control device (not shown), which can be part of the device electronics 5. In this embodiment of the invention, detection and control processes can preferably also take place in the control device. The control device can comprise a processor and/or a memory, in which case, for example, the limit values for the angle of rotation and the rotational speed can be stored in the memory of the control device. The position of the motor 4 and of the device electronics 5 is indicated in FIG. 1 only by way of example. The stated components of the power tool 1 can of course be arranged at various other locations within the power tool 1.

LIST OF REFERENCE SIGNS

1 Power tool
2 Tool fitting of the power tool
3 Tool of the power tool
4 Motor of the power tool
5 Device electronics of the power tool
6 User

What is claimed is:

1. A method for activating a spindle lock in a power tool, the power tool having a tool fitting for receiving a tool, a motor and device electronics, the method comprising the following method steps:
 a) carrying out a first rotary movement with the tool fitting of the power tool in a first direction of rotation, the first rotary movement definable by an angle of rotation or a rotational speed, a limit value for the angle of rotation or the rotational speed being stored in the power tool; and
 b) activating the spindle lock via the device electronics of the power tool if at least one of the limit values for the angle of rotation or the rotational speed is exceeded;

wherein the first rotary movement is defined by the angle of rotation and a magnitude of the limit value for the angle of rotation is in a range from 1 to 120 degrees.

2. A method for deactivating the spindle lock activated according to the method as recited in claim 1, the method comprising the following method steps:
   a) applying a torque to the motor of the power tool in a second direction of rotation while the spindle lock is active;
   b) inducing rotary movement of the tool fitting in the second direction due to the torque being applied to the motor in the second direction,
   c) detecting the rotary movement in the second direction by the device electronics;
   d) deactivating the spindle lock by the device electronics of the power tool when a rotary movement of the tool fitting in the second direction is detected.

3. The method as recited in claim 2 wherein releasing the tool fitting by a user of the power tool leads to a torque being applied to the motor and to the rotary movement of the tool fitting in the second direction.

4. The power tool for carrying out the method as recited in claim 2, the power tool comprising:
   the tool fitting for receiving the tool;
   the motor; and
   the device electronics,
   a torque applyable to the motor of the power tool, the device electronics being set up to detect the rotary movement of the tool fitting and to deactivate the spindle lock when the rotary movement in the second direction is detected.

5. The power tool as recited in claim 4 wherein the torque is applied to the motor while a spindle lock is active.

6. The power tool as recited in claim 4 wherein application of the torque to the motor leads to the rotary movement of the tool fitting.

7. The power tool as recited in claim 4 wherein the power tool is a core drilling device.

8. The power tool as recited in claim 4 wherein the power tool does not require an additional switch for activating or deactivating the spindle lock.

9. The method as recited in claim 1 further comprising deactivating the spindle lock by applying a torque to the motor of the power tool in a second direction of rotation while the spindle lock is active, the first and the second directions being opposite to each other.

10. The method as recited in claim 1 wherein the rotary movement of the tool fitting in the first direction is detected by the device electronics as a rotation of the motor of the power tool without active current supply.

11. The method as recited in claim 1 wherein the magnitude of the limit value for the angle of rotation is in a range from 1 to 90 degrees.

12. The method as recited in claim 11 wherein the magnitude of the limit value for the angle of rotation is in a range from 1 to 60 degrees.

13. The method as recited in claim 1 wherein the first rotary movement is defined by the rotation value and the limit value for the rotational speed is in a range from 0.05 degree/second to 60 degrees/second.

14. The method as recited in claim 13 wherein the range is from 0.2 degree/second to 45 degrees/second.

15. The method as recited in claim 14 wherein the range is from 0.5 degree/second to 30 degrees/second.

16. A power tool for carrying out the method as recited in claim 1, the power tool comprising:
   the tool fitting for receiving the tool;
   the motor; and
   the device electronics,
   the tool fitting designed to be rotatable and the device electronics set up to detect an angle of rotation or a rotational speed of a rotary movement of the tool fitting, a spindle lock activatable with the device electronics if the limit value for the angle of rotation or the rotational speed is exceeded.

17. The power tool as recited in claim 16 wherein the power tool is a core drilling device.

18. The power tool as recited in claim 16 wherein the power tool does not require an additional switch for activating or deactivating the spindle lock.

19. The method as recited in claim 1 wherein the spindle lock is a core drilling device spindle lock, cut-off or angle grinder spindle lock, hammer drill spindle lock or chisel spindle lock.

* * * * *